Patented Apr. 4, 1944

2,345,961

UNITED STATES PATENT OFFICE 2,345,961

REFINING AND STABILIZATION OF VITAMIN-CONTAINING MATERIALS

Loran O. Buxton, Belleville, N. J., assignor to National Oil Products Company, Harrison, N. J., a corporation of New Jersey No Drawing. Application July 25, 1941, Serial No. 403,996

13 Claims. (Cl. 167—81)

This invention relates to the refining and stabilization of vitamin-containing materials, more particularly to the refining of fat-soluble vitamin-containing oils and concentrates and the stabilization thereof against oxidative deterioration.

As is well known in the art, fat-soluble vitamin-containing oils and concentrates prepared therefrom have been used for a wide variety of useful purposes, particularly in the nutritional fields. However, many of these fat-soluble vitamin-containing materials, particularly products of fish origin, have characteristic tastes and odors of an unpleasant nature; furthermore, the color of these materials is often dark, thus rendering the materials unattractive from a consumer standpoint. These undesirable properties have in some cases tended to limit the field of usefulness of these materials; as a result, there has been a great demand for a simple and effective process for removing the objectionable color, odor and taste therefrom.

It has been proposed to improve the flavor and odor of the unsaponifiable fraction of fish liver oils through the removal of certain constituents responsible therefor by dissolving the unsaponifiable matter in a suitable solvent and percolating the same through a column or the like containing an animal or vegetable carbon or earth. The unsaponifiable matter contains the vitamin A of the fish oil, and since vitamin A is highly sensitive to oxygen and likely to be destroyed thereby in this process which has been proposed, the system is kept flooded with carbon dioxide in order to prevent destruction of the vitamin A. In addition to having to keep the system flooded with carbon dioxide, it is also necessary to add an antioxidant such as hydroquinone or pyrogallol to the solvent solution to protect the vitamins from oxidation. Such antioxidants are toxic and must be removed from the concentrate by treating the solution after it has been passed through the carbon in the column with an alkaline solution, which removes the antioxidant. Not only is the process cumbersome and costly, but also it has been found that such antioxidants do not function any too well in their role of protecting the vitamins from destruction by oxidation; and, of course, since the antioxidants must be removed after the refining treatment, they can in no way give the vitamins any protection from oxidation during the time ensuing between the refining and the ultimate consumption of the vitamin-containing material by the consumer. Although such a process has displayed a slight degree of merit on a laboratory scale, it is not, in view of the disadvantages herein set out, very satisfactory for commercial practice.

In order to meet the demand for a simple, efficient process for refining fat-soluble vitamin-bearing materials, I have developed the process which is disclosed and claimed in my copending application Serial No. 227,599, filed August 30, 1938, which issued Dec. 29, 1942 as Patent No. 2,306,776. This process involves contacting a solution of a fat-soluble vitamin-containing material with activated adsorbents, particularly activated carbon, under anaerobic conditions. Because of the excellent solubility of fat-soluble vitamin-containing materials in hydrocarbon and halogenated hydrocarbon solvents of a relatively non-polar nature, these substances are recommended among others for use as solvents for the fat-soluble vitamin-containing materials in this process. Subsequent investigations, however, revealed that when solutions of fat-soluble vitamin-containing materials in hydrocarbon or halogenated hydrocarbon solvents were contacted with certain types of very highly active adsorbents, such as activated earths and clays or blood charcoal, some of the valuable vitamins were adsorbed along with the undesirable constituents and thereby lost.

To overcome that disadvantage, the process which is disclosed and claimed in copending application Serial No. 374,080, filed January 11, 1941, in the names of Buxton and Simons, was developed, which issued Dec. 16, 1941, as Pat. No. 2,266,719. It was found that by incorporating a relatively small amount (not more than 10%) of an oxygen-containing organic compound having a polar functional grouping into the hydrocarbon or halogenated hydrocarbon solvent, the undesirable constituents contained in fat-soluble vitamin-containing materials which are responsible for objectionable odor, color and taste may be removed therefrom without the loss of substantially any of the valuable vitamins by contacting such a solvent solution of vitamin-containing materials with a highly active adsorbent. The term "polar functional grouping" is used to connote the functional grouping in a compound which tends to produce an unbalanced electronic structure, and thereby activates the molecule and imparts a characteristic dipole moment thereto; examples of such polar functional groupings are the hydroxyl group, the carbonyl group, the carboxyl group, and the ester group.

By using the process of either of the above-identified inventions, it is possible to produce highly refined vitamin-containing materials having no objectionable color, taste or odor without any of the vitamins contained therein being affected by deteriorative oxidative changes during the refining process. Subsequent investigations, however, have revealed that during the refining processes, a large part of the natural antioxidants contained in fish oils and fish liver oils, and fractions or concentrates thereof is removed from these vitamin-containing materials by being adsorbed on the absorbent. Consequently, after being refined, these vitamin products are less stable towards oxidative changes than are the unrefined materials; and frequently undesirable oxidative changes take place therein during the time between the refining and the ultimate consumption of the products.

In carrying out experiments relating to the solvent extraction of fatty materials, I have found that by treating natural antioxidant-containing fatty vegetable materials with certain types of organic solvents, highly potent extracts containing the majority of the natural antioxidants of the fatty vegetable material concentrated therein may be obtained. Thus I have found that a highly potent antioxidant extract may be obtained from a natural antioxidant-containing vegetable oil by contacting said oil with a suitable solvent at room temperature or above, such that at least the major portion of the oil is miscible with the solvent, and then cooling the mixture to a temperature within the range of 0° C. to —70° C., whereby a solvent layer containing the desired antioxidant extract separates. Among the solvents which were found to be particularly suitable for use in this process are those listed in the table below:

TABLE

1. Aliphatic and alicyclic monohydroxy alcohols containing from 3 to 6 carbon atoms.
2. Esters formed by the reaction of aliphatic and alicyclic alcohols with aliphatic monocarboxylic acids, said esters containing not more than 8 carbon atoms.
3. Aliphatic and alicyclic aldehydes containing not more than 6 carbon atoms.
4. Aliphatic ketones containing not more than 6 carbon atoms.

It will be noted that these preferred solvents are all liquid organic compounds having the properties of being substantially miscible with fatty oils at temperatures above room temperature and partially immiscible therewith at temperatures substantially below room temperature; experiments in this connection have shown that solvents of this class may be used generally in the process hereinabove described. This process is more fully described and claimed in my copending application Serial No. 351,909, filed August 8, 1940. I have also found that highly potent antioxidant extracts may be obtained from natural antioxidant-containing vegetable materials that are oil-bearing solids, e. g. oil-bearing wheat germ meal, corn germ meal, soybean meal, etc., by treating these materials with solvents by a process similar to that of application Serial No. 351,909. This last mentioned process is more fully described and claimed in copending application Serial No. 397,547, filed June 11, 1941. For further information concerning these processes reference may be had to the above-identified applications.

It is an object of this invention to provide an improved process for removing color, taste and odor from fat-soluble vitamin-containing materials.

It is a more specific object of this invention to provide a process for adsorbing color, taste and odor from fat-soluble vitamin-containing materials without impairing the future stability towards deteriorative oxidative changes of said materials.

Other objects of the invention will in part be obvious and will in part appear hereinafter.

I have found that the above and other objects of the invention may be accomplished by refining vitamin-containing materials in accordance with the process of application Serial No. 227,599, or the process of application Serial No. 374,080 by incorporating into the vitamin-containing material before it is refined, natural oil-soluble antioxidants obtained from vegetable materials in accordance with either the process of application Serial No. 351,909 or application Serial No. 397,547, or antioxidants similar to the ones produced by those processes, but produced by other processes. For example, antioxidants concentrated from vegetable oils by high vacuum distillation may be used. Vitamin E and its homologues may be also employed in practicing this invention. These natural antioxidants are not removed in any substantial amount from the vitamin-containing materials by the refining process, and therefore the refined materials which are obtained are much more stable towards future oxidative changes than materials similarly refined, but to which no natural antioxidants have been added. In fact, in some cases the refined products are more stable toward deteriorative oxidative changes than are the crude materials. A further advantage of this process is that it also removes certain undesirable colors associated with some of the natural vegetable antioxidants. Thus a highly stable, light-colored product substantially devoid of undesirable tastes and odors is obtained. As these antioxidants are entirely non-toxic, any amount of them may be added as is desired. However, in most cases only relatively small amounts of them will be required.

The preferred embodiment of my invention involves contacting a solvent solution of a fish liver oil or concentrate prepared therefrom, and to which has been added a natural oil soluble vegetable antioxidant concentrate, under anaerobic conditions with an adsorbent, such as activated carbon or charcoal or an activated earth or clay; by operating in this manner highly valuable products may be inexpensively produced from the readily available fish liver oils.

The fat-soluble vitamin-containing materials which may be treated in accordance with my invention may be any material containing substantial quantities of the fat-soluble vitamins from which it may be desired to remove undesirable color, taste or odor; thus, for example, fish liver oils, such as cod liver oil, shark liver oil, ling cod liver oil, halibut liver oil, tuna liver oil, mackerel liver oil, sword fish liver oil, etc. may be treated. Furthermore, concentrates prepared from these oils by saponification of the oil and extraction of the unsaponifiable fraction may also be advantageously processed by this invention; highly potent products prepared by subjecting fish liver oils to high vacuum distillation may also be treated with success. Other materials having objectionable color, odor or taste and containing vitamin A and/or D in either the alcohol or ester form, or provitamin A or electrically or chemically activated forms of vitamin D may also be advantageously refined by the process of this invention.

The adsorbents employed may be practically any adsorbent capable of removing constituents responsible for the objectionable color, taste or odor of a fat-soluble vitamin-containing material. Thus, for example, the various types of decolorizing carbons, e. g. blood charcoal or activated animal or vegetable carbons, may be employed.

Furthermore, earths or clays activated by treatment with acid or heat such as fuller's earth, "Tonsil," and similar products may be used in conjunction with the activated carbon. Any one of the many aluminum oxide adsorbents known to the art may also be employed along with the carbon adsorbent.

The fat-soluble vitamin-containing material may, in accordance with this invention, be contacted with the adsorbents in a variety of ways. Preferably the process is carried out under anaerobic conditions according to the procedure described in copending application Serial No. 227,599, of Buxton, filed August 30, 1938. In accordance with this procedure one of the adsorbents above mentioned is first thoroughly deaerated by agitating the same with the solvent to be used as the solvent for the fat-soluble vitamin-containing material. Solvents which may be used include, inter alia, hexane, heptane, octane, ethylene dichloride, carbon tetrachloride, cyclohexane, methyl cyclohexane, benzene, trichloroethylene and generally the hydrocarbon and halogenated hydrocarbon solvents and mixtures thereof. Polar solvents used in conjunction with the non-polar solvents include, among others, methyl alcohol, ethyl alcohol, propyl alcohol, isopropyl alcohol, cyclohexanol, acetone, methylethyl ketone, methyl acetate, methyl formate, ethyl acetate, and mixtures of such solvents or similar solvents. In the carbon refining of the unsaponifiable fraction of fish liver oils, any one of the foregoing polar solvents may be used alone to the exclusion of the non-polar solvents, if desired. The deaeration is preferably accomplished by mixing the solvent with the adsorbent in amounts such that the weight of the solvent is at least 4 times, and preferably between about 20 and about 40 times, the weight of the adsorbent, the particular amount of adsorbent varying with the amount of fat-soluble vitamin-containing material to be refined, and then agitating the mixture thoroughly until the air is expelled from the adsorbent and a solvent vapor zone created directly over the mass to prevent access of air. Heat and reduced pressures may be applied to assist or accelerate the deaeration, if desired. Furthermore, it is not necessary to add all the solvent to the adsorbent prior to deaeration, since a portion can be used to deaerate the adsorbent and the remainder subsequently added to the mass either alone or along with the vitamin material to be refined. In any event at the termination of the deaeration treatment, entrapped air will be entirely expelled from the adsorbent and vapors of the solvent will prevent air from contacting the adsorbent-vitamin mass during the refining operation.

Before the fat-soluble vitamin-containing material is added to the deaerated adsorbent, it is preferable to add the desired amount of antioxidant to the vitamin-containing material although, if desired, the antioxidant may be added to the mixture after the vitamin-containing material has been added thereto. The amount of antioxidant extract which is added may vary considerably, depending upon the activity of the extract and the degree of instability which the vitamin-containing material would exhibit after being refined if no antioxidants were added thereto. I have found that fat-soluble vitamin-containing oils and concentrates to which from 0.1% to about 20%, preferably from 0.5% to 5%, of my antioxidant extracts have been added, may be refined by means of adsorbents as herein set out without materially affecting their future stability towards oxidative changes and in many cases markedly improving such stability with respect to the crude material.

When the adsorbent has been deaerated, the fat-soluble vitamin-containing material to which the natural vegetable antioxidants have been added may then be added to the deaerated mixture; the amount of material added should be such that the weight of fat-soluble vitamin-containing material is not greater than the weight of the solvent, and preferably it should be between about 15% and about 20% of the weight of the solvent. Tht fat-soluble vitamin-containing material added may be dissolved in a solvent compatible with the solvent in which the adsorbent is deaerated; thus, for example, solutions containing fat-soluble vitamins such as those obtained by the solvent extraction of fish livers or fish liver oils may be treated. The mass may then be stirred for a suitable time, with the application of heat and reduced pressure, if desired, until adsorption of the undesirable constituents has been completed; it will be found that approximately one hour is usually sufficient to adsorb the bulk of the objectionable constituents from the fat-soluble vitamin-containing material. The suspended adsorbent may then be permitted to settle, the mass filtered and the residue washed with the particular solvent employed in order to remove any fat-soluble vitamins from the adsorbents. The wash liquids may then be combined with the filtrate, the solvent evaporated and the refined fat-soluble vitamin-containing material thus recovered.

It is to be understood that the process of my invention may be modified somewhat. Thus, for example, the fat-soluble vitamin-containing material containing the natural vegetable antioxidants may be dissolved in a suitable solvent of the type above described and this solution then percolated through a bed of an adsorbent, preferably one which has been deaerated by contact with a solvent of a type similar to that used for the material being refined; this method of operation has the advantage of being substantially continuous. If the fat-soluble vitamin-containing material to be refined contains free fatty acids, a portion of these may be removed prior to refining in accordance with the process described in copending application Serial No. 227,600, filed August 30, 1938 in the names of Buxton and Simons, which issued Sept. 16, 1941, as Patent No. 2,255,875. The adsorbents used may contain filter aids to assist in their removal from the refined material. Other modifications may also be introduced without departing from the scope of this invention.

For a fuller understanding of the nature and objects of the invention, reference should be had to the following examples which are given merely to further illustrate the invention and are not to be construed in a limiting sense, all parts given being by weight.

EXAMPLE I 95 parts of crude shark liver oil containing 103,000 U. S. P. units of vitamin A/gm. were mixed with 5 parts of an antioxidant fraction extracted from wheat germ oil by the process in patent application Serial No. 351,909. This mixture was then added to 400 parts of heptane containing suspended therein 20 parts of an activated carbon (Nuchar XXX). This mixture was stirred for 30 minutes at room temperature, The activated carbon was removed by filtration and the solvent removed under reduced pressure. The resulting oil was devoid of fishiness, light yellow in color, and more stable than the crude oil. The vitamin A content of the refined oil was substantially the same as that of the unrefined material.

EXAMPLE II 95 parts of crude shark liver oil containing 103,000 U. S. P. units of vitamin A/gm. were mixed with 5 parts of an antioxidant concentrate from a 50-50 mixture of soybean oil and wheat germ oil. This mixture was treated further exactly as in Example I. The refined oil was substantially odorless and tasteless and highly stable toward oxidative deterioration and had substantially the same vitamin potency as the unrefined material.

EXAMPLE III 190 parts of halibut liver oil containing 78,000 U. S. P. units of vitamin A/gm. and 5,000 U. S. P. units of vitamin D/gm. were mixed with 10 parts of an antioxidant concentrate extracted from freshly prepared corn germ meal by the process in patent application Serial No. 397,547. This mixture was then added to 600 parts of 97% cyclohexane (3% of isopropanol) containing suspended therein 10 parts of an activated carbon (Darco G-60). This mixture was agitated for 1 hour at room temperature. The activated carbon was then removed by filtration and the solvent evaporated under reduced pressure. The resulting oil was substantially odorless, tasteless, light yellow in color, and more resistant to oxidation than the crude oil. The vitamin A and D content of the refined and stabilized product was unchanged.

The stability of the refined oils and that of the same crude fish liver oils similarly refined, except that no vegetable antioxidant was added to the oil, was determined by carrying out stability tests under accelerated conditions. In these tests the oils were maintained at a constant temperature of 34.5° C. in the presence of air for a number of days and the percentage of vitamin A destroyed then determined. The results of these tests are given in Table A.

*Table A*

| Sample | Per cent vitamin A destroyed in— | | |
|---|---|---|---|
| | 4 days | 6 days | 14 days |
| Shark liver oil refined without adding antioxidants | | 38.2 | 70.8 |
| Shark liver oil refined in the presence of 5% of an antioxidant concentrate prepared from wheat germ oil | | 7.5 | 26.3 |
| Shark liver oil refined in the presence of 5% of an antioxidant concentrate prepared from a 50-50 mixture of wheat germ oil and soybean oil | | 12.3 | 35.2 |
| Halibut liver oil refined without adding antioxidants | 19.1 | 56.4 | |
| Halibut liver oil refined in the presence of 5% of an antioxidant concentrate prepared from corn germ meal | 4.6 | 12.0 | 28.0 |

From the above description it will be evident that the process of my invention permits the more successful refining of fat-soluble vitamin-containing materials by the adsorption method. By reason thereof, this process will be of great value to the industry.

The expression "natural vegetable antioxidant concentrate" is employed herein to connote an antioxidant obtained from crude vegetable oils or meals by any suitable process including those described in aforesaid applications Serial Nos. 351,909 and 397,547.

Since certain changes may be made in carrying out the above process without departing from the scope of the invention, it is intended that all matter contained in the above description shall be interpreted as illustrative and not in a limiting sense.

Having described my invention, what I claim as new and desire to secure by Letters Patent, is:

1. A process of removing objectionable color, odor and taste from fat-soluble vitamin-containing materials, which comprises admixing activated carbon with an organic solvent, deaerating the carbon-solvent mixture by means of agitation, adding to the deaerated carbon-solvent mixture the fat-soluble vitamin-containing material and a small amount of a natural antioxidant concentrate prepared by contacting a natural antioxidant-containing material selected from the group consisting of vegetable oils and vegetable oil-bearing solids, at a temperature above room temperature with a solvent selected from the group consisting of aliphatic and alicyclic monohydroxy alcohols containing 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, cooling the mass to a temperature within the range of 0° C. to —70° C. whereby layers are formed, separating the solvent layer from the insoluble residues and removing the extracted natural antioxidant concentrate from the solvent, agitating the entire mass to effect adsorption of impurities on the carbon and separating the refined antioxidant containing fat-soluble vitamin-containing material and solvent from the carbon and impurities adsorbed thereon.

2. A process of removing objectionable color, odor and taste from fat-soluble vitamin-containing materials, which comprises admixing activated carbon with an organic solvent, deaerating the carbon-solvent mixture by means of agitation, adding to the deaerated carbon-solvent mixture the fat-soluble vitamin-containing material containing a small amount of a natural antioxidant concentrate prepared by contacting a natural antioxidant-containing material selected from the group consisting of vegetable oils and vegetable oil-bearing solids, at a temperature above room temperature with a solvent selected from the group consisting of aliphatic and alicyclic monohydroxy alcohols containing 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, cooling the mass to a temperature within the range of 0° C. to —70° C. whereby layers are formed, separating the solvent layer from the insoluble residues and removing the extracted natural antioxidant concentrate from the solvent, agitating the entire mass while heating the same to effect adsorption of impurities on the carbon, and separating the refined antioxidant containing fat-soluble vitamin-containing material and solvent from carbon and impurities adsorbed thereon.

3. A process of removing objectionable color, odor and taste from fat-soluble vitamin-containing materials, which comprises admixing activated carbon and colloidal clay with an organic solvent, deaerating the clay-carbon-solvent mixture by means of agitation, adding to the deaerated clay-carbon-solvent mixture the fat-soluble vitamin-containing material containing a small amount of a natural antioxidant concentrate prepared by contacting a natural antioxidant-containing material selected from the group consisting of vegetable oils and vegetable oil-bearing solids, at a temperature above room temperature with a solvent selected from the group consisting of aliphatic and alicyclic monohydroxy alcohols containing 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, cooling the mass to a temperature within the range of 0° C. to —70° C. whereby layers are formed, separating the solvent layer from the insoluble residues and removing the extracted natural antioxidant concentrate from the solvent, agitating the entire mass to effect adsorption of impurities on the carbon and clay, and separating the refined antioxidant containing fat-soluble vitamin-containing material and solvent from the clay, carbon and impurities adsorbed thereon.

4. A process of removing objectionable color, odor and taste from fat-soluble vitamin-containing materials, which comprises admixing activated carbon with a hydrocarbon solvent, deaerating the carbon-solvent mixture by means of agitation, adding to the deaerated carbon-solvent mixture the fat-soluble vitamin-containing material containing a small amount of a natural antioxidant concentrate prepared by contacting a natural antioxidant-containing material selected from the group consisting of vegetable oils and vegetable oil-bearing solids, at a temperature above room temperature with a solvent selected from the group consisting of aliphatic and alicyclic monohydroxy alcohols containing 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, cooling the mass to a temperature within the range of 0° C. to —70° C. whereby layers are formed, separating the solvent layer from the insoluble residues and removing the extracted natural antioxidant concentrate from the solvent, agitating the entire mass to effect adsorption of impurities on the carbon, and separating the refined antioxidant containing fat-soluble vitamin-containing material and solvent from the carbon and impurities adsorbed thereon.

5. A process of removing objectionable color, odor and taste from fat-soluble vitamin-containing materials, which comprises admixing activated carbon with a chlorinated hydrocarbon solvent, deaerating the carbon-solvent mixture by means of agitation, adding to the deaerated carbon-solvent mixture the fat-soluble vitamin-containing material containing a small amount of a natural antioxidant concentrate prepared by contacting a natural antioxidant-containing material selected from the group consisting of vegetable oils and vegetable oil-bearing solids, at a temperature above room temperature with a solvent selected from the group consisting of aliphatic and alicyclic monohydroxy alcohols containing 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, cooling the mass to a temperature within the range of 0° C. to —70° C. whereby layers are formed, separating the solvent layer from the insoluble residues and removing the extracted natural antioxidant concentrate from the solvent, agitating the entire mass to effect adsorption of impurities on the carbon, and separating the refined antioxidant containing fat-soluble vitamin-containing material and solvent from the carbon and impurities adsorbed thereon.

6. A process of removing objectionable color, odor and taste from fish liver oils, which comprises admixing activated carbon with a hydrocarbon solvent, deaerating the carbon-solvent mixture by means of agitation, adding to the deaerated carbon-solvent mixture a fish liver oil containing a small amount of a natural antioxidant concentrate prepared by contacting a natural antioxidant-containing material selected from the group consisting of vegetable oils and vegetable oil-bearing solids, at a temperature above room temperature with a solvent selected from the group consisting of aliphatic and alicyclic monohydroxy alcohols containing 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, cooling the mass to a temperature within the range of 0° C. to —70° C. whereby layers are formed, separating the solvent layer from the insoluble residues and removing the extracted natural antioxidant concentrate from the solvent, agitating the entire mass to effect adsorption of impurities on the carbon, and separating the refined antioxidant containing fish liver oil and solvent from the carbon and impurities adsorbed thereon.

7. A process of removing objectionable color, odor and taste from fish liver oils, which comprises admixing activated carbon with a chlorinated hydrocarbon solvent, deaerating the carbon-solvent mixture by means of agitation, adding to the deaerated carbon-solvent mixture a fish liver oil containing a small amount of a natural antioxidant concentrate prepared by contacting a natural antioxidant-containing material selected from the group consisting of vegetable oils and vegetable oil-bearing solids, at a temperature above room temperature with a solvent selected from the group consisting of aliphatic and alicyclic monohydroxy alcohols containing 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, cooling the mass to a temperature within the range of 0° C. to —70° C. whereby layers are formed, separating the solvent layer from the insoluble residues and removing the extracted natural antioxidant concentrate from the solvent, agitating the entire mass to effect adsorption of impurities on the carbon, and separating the refined antioxidant containing fish liver oil and solvent from the carbon and impurities adsorbed thereon.

8. The process set forth in claim 4, wherein a relatively small quantity of a polar solvent is included in the hydrocarbon solvent.

9. The process set forth in claim 5, wherein a relatively small quantity of a polar solvent is included in the chlorinated hydrocarbon solvent.

10. The process set forth in claim 6, wherein a relatively small quantity of a polar solvent is included in the hydrocarbon solvent.

11. The process set forth in claim 7, wherein a relatively small quantity of a polar solvent is included in the chlorinated hydrocarbon solvent.

12. The process set forth in claim 6, wherein a relatively small quantity of a lower aliphatic alcohol is included in the hydrocarbon solvent.

13. The process set forth in claim 7, wherein a relatively small quantity of a lower aliphatic alcohol is included in the chlorinated hydrocarbon solvent.

LORAN O. BUXTON.